US012594760B2

(12) United States Patent
Hwang et al.

(10) Patent No.: US 12,594,760 B2
(45) Date of Patent: Apr. 7, 2026

(54) NOZZLE AND PRINTING DEVICE INCLUDING SAME

(71) Applicant: Samsung Display Co., LTD., Yongin-si (KR)

(72) Inventors: Chan Hae Hwang, Yongin-si (KR); Minkyu Shin, Yongin-si (KR); Tae-Ho Youn, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 248 days.

(21) Appl. No.: 18/499,012

(22) Filed: Oct. 31, 2023

(65) Prior Publication Data

US 2024/0140089 A1 May 2, 2024

(30) Foreign Application Priority Data

Nov. 1, 2022 (KR) ........................ 10-2022-0143808

(51) Int. Cl.
*B41J 2/14* (2006.01)

(52) U.S. Cl.
CPC ...................................... *B41J 2/14* (2013.01)

(58) Field of Classification Search
CPC .. B41J 2/1433; B41J 2/14; B41J 2002/14419; B41J 2/14233; B41J 2/135; B41J 2/04511; B41J 2/04501; B41J 2/01; B41J 2/015; B41J 2/04; B41J 2/045; B41J 2/035; B41J 2/02; B29C 64/209; B29C 64/393; B33Y 10/00; B33Y 30/00
See application file for complete search history.

(56) References Cited

FOREIGN PATENT DOCUMENTS

| | | | | |
|---|---|---|---|---|
| KR | 1020160031200 | 3/2016 | | |
| KR | 101608209 B1 | 4/2016 | | |
| KR | 102047025 B1 | 12/2019 | | |
| KR | 1020210002304 | 1/2021 | | |
| KR | 102474963 B1 | 12/2022 | | |
| WO | WO-2017106978 A1 * | 6/2017 | .......... | B29C 64/209 |

* cited by examiner

*Primary Examiner* — Jannelle M Lebron
(74) *Attorney, Agent, or Firm* — CANTOR COLBURN LLP

(57) ABSTRACT

A nozzle according to an embodiment includes: a metal portion, which defines a penetration hole therein; and a ceramic portion, which surrounds the metal portion, where the metal portion includes a first region and a second region having a narrower diameter than the first region, the ceramic portion surrounds the second region, and an end of the metal portion close to a discharging end of the nozzle is spaced apart from an end of the ceramic portion close to the discharging end.

16 Claims, 10 Drawing Sheets

NOZZLE AND PRINTING DEVICE INCLUDING SAME

This application claims priority to Korean Patent Application No. 10-2022-0143808, filed on Nov. 1, 2022, and all the benefits accruing therefrom under 35 U.S.C. § 119, the content of which in its entirety is herein incorporated by reference.

BACKGROUND

(a) Technical Field

The present disclosure relates to a nozzle and a printing device including the nozzle.

(b) Description of the Related Art

In a manufacturing process of a display device, an emission layer, a thin film encapsulation layer, a color filter layer, and the like may be formed through a printing process.

An Inkjet device may be used to perform the printing process. The inkjet device may include a body for storing ink, a spray member including a nozzle for discharging ink, and a stage for disposing a substrate.

At this time, the thrust of discharged ink may be increased by applying a voltage to the nozzle.

SUMMARY

Embodiments are to provide a nozzle that prevents spark generation while maintaining a spray force of the nozzle, and a printing device including the same.

A nozzle according to an embodiment includes: a metal portion, which defines a penetration hole therein; and a ceramic portion, which surrounds the metal portion, where the metal portion includes a first region and a second region having a narrower diameter than the first region, the ceramic portion surrounds the second region, and an end of the metal portion close to a discharging end of the nozzle is spaced apart from an end of the ceramic portion close to the discharging end.

A separation distance between the end of the metal portion and the end of the ceramic portion may be about 0.1 millimeters (mm) to about 3 mm.

The ceramic portion may define a first groove having a diameter corresponding to an outer diameter of the second region of the metal portion and a second groove having a narrower diameter than the first groove.

The second groove may be connected to the penetration hole defined in the metal portion.

The second groove may be disposed at the discharging end of the nozzle, and the second groove may not overlap the metal portion in a view in a central axis direction of the nozzle.

A length of the second groove in a longitudinal direction of the nozzle may be about 0.1 mm to about 3 mm.

A surface roughness of the penetration hole of the metal portion may be about 0.5 micrometers (μm) or less.

A surface roughness of the second groove of the ceramic portion may be less than 0.5 μm.

The ceramic portion may be removable from the metal portion.

A resin to be sprayed from the nozzle sequentially may pass through the penetration hole of the metal portion and the second groove of the ceramic portion before being sprayed.

The ceramic portion may contain a sintered ceramic including a ceramic, glass, plastic, and metal powder.

The ceramic portion may have a non-conductive characteristic.

A printing device according to an embodiment includes: a nozzle; and a power supply, which applies a voltage to the nozzle, where the nozzle includes: a metal portion defining a penetration hole therein and a ceramic portion, which surrounds the metal portion. The metal portion includes a first region and a second region having a narrower diameter than the first region, the ceramic portion surrounds the second region, and an end of the metal portion close to a discharging end of the nozzle is separated from an end of the ceramic portion close to the discharging end.

A distance between the end of the metal portion and the end of the ceramic portion may be about 0.1 mm to about 3 mm.

The ceramic portion may define a first groove with a diameter corresponding to an outer diameter of the second region of the metal portion and a second groove with a narrower diameter than the first groove.

The second groove may be connected to the penetration hole defined in the metal portion.

The second groove may be disposed at the discharging end of the nozzle, and the second groove may not overlap the metal portion in a view in a central axis direction of the nozzle.

A length of the second groove in a longitudinal direction of the nozzle may be about 0.1 mm to about 3 mm.

A surface roughness of the penetration hole of the metal portion and the second groove of the ceramic portion may be about 0.5 μm or less.

The printing device may further include a pneumatic member connected to the nozzle.

According to the embodiments, a nozzle that prevents spark generation while maintaining a spray force of the nozzle, and a printing device including the same can be provided.

DETAILED DESCRIPTION

Figure 1:
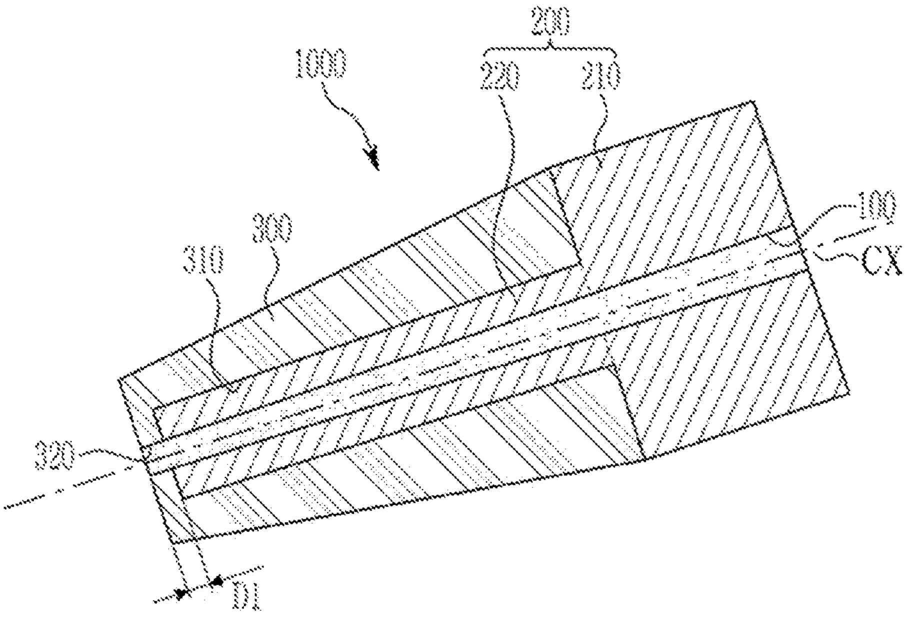
FIG. 1 is a cross-sectional view of a nozzle according to the present embodiment.

Hereinafter, with reference to accompanying drawings, various embodiments of the present disclosure will be described in detail such that a person of an ordinary skill can easily practice them in the technical field to which the present disclosure belongs. The present disclosure may be implemented in many different forms and is not limited to the embodiments described herein.

In order to clearly explain the present disclosure, parts irrelevant to the description are omitted, and identical or similar constituent elements are given the same reference numerals throughout the specification.

In addition, since the size and thickness of each component shown in the drawing is arbitrarily shown for better understanding and ease of description, the present disclosure is not necessarily limited to the drawings. In the drawings, the thickness of layers, films, panels, regions, etc., are exaggerated for clarity. In addition, in the drawing, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "on" a reference portion will be understood to mean disposed above or below the reference portion, and will not necessarily be understood to mean disposed "at an upper side" based on an opposite to gravity direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" or "in a plan view" means viewing a target portion from the top, and the phrase "on a cross-section" means viewing a cross-section formed by vertically cutting a target portion from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The present disclosure relates to a nozzle and a printing device including the same, and will be described in detail with reference to the drawings.

First, a nozzle will be described. FIG. 1 is a cross-sectional view of a nozzle according to the present embodiment. Referring to FIG. 1, a nozzle 1000 according to the present embodiment includes a metal portion 200 where a penetration hole 100 is defined, and a ceramic portion 300, which surrounds a metal portion 200. The nozzle 1000 according to the present embodiment has a central axis CX and has a symmetrical shape with respect to the central axis CX. In an embodiment, for example, a cross-section of the nozzle 1000 (especially, each of the metal portion 200 and the ceramic portion 300) perpendicular to the central axis CX may have a circular shape, an oval shape or a polygonal shape.

Referring to FIG. 1, the penetration hole 100 is defined at a center of the metal portion 200. The penetration hole 100 becomes a passage through which resin passes during the printing process.

As shown in FIG. 1, the metal portion 200 includes a first region 210 with a larger diameter and a second region 220 with a narrower diameter. A width of the second region 220 is narrower than a width of the first region 210, and the ceramic portion 300 surrounds the periphery of the second region 220.

Figure 2:
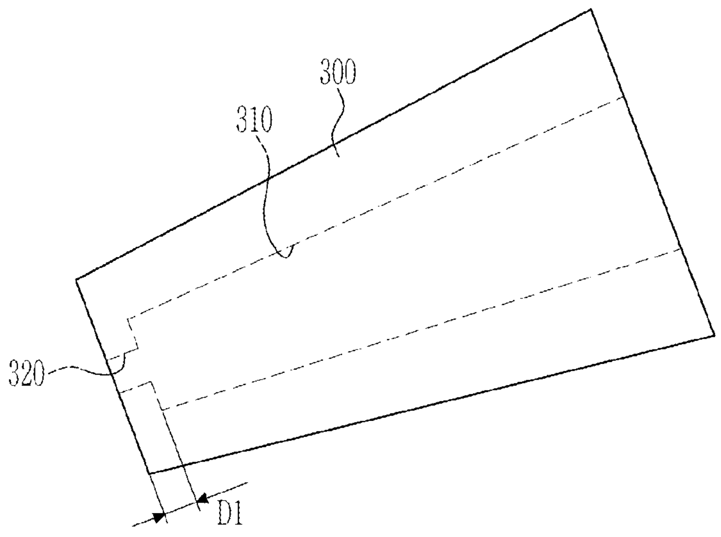
FIG. 2 separately illustrates a configuration of the ceramic portion.

FIG. 2 separately illustrates a configuration of the ceramic portion 300. As shown in FIG. 2, the ceramic portion 300 may define a first groove 310 therein having a size (e.g., diameter) corresponding to a size (e.g., outer dimeter) of the second region 220 of the metal portion 200. An outer surface of the second region 220 of the metal portion 200 may be covered by the ceramic portion 300. As shown in FIG. 2, a second groove 320, which has a smaller diameter than the first groove 310 is defined at the end of the ceramic portion 300. The first groove 310 and the second groove 320 may be connected with each other. The second groove 320 may have the same diameter as the penetration hole 100 defined in the metal portion 200, and may be connected to the penetration hole 100 defined in the metal portion 200. The second groove 320 may not overlap the metal portion 200 in a view in a central axis CX direction of the nozzle 1000. In FIG. 2, the first groove 310 and the second groove 320 are shown as dotted lines as they are disposed inside the ceramic portion 300.

That is, referring to FIG. 1, the end of the metal portion 200 close to the discharging end of the nozzle 1000 may be covered by the ceramic portion 300. That is, at the discharging end of the nozzle 1000, the metal portion 200 is not exposed and the ceramic portion 300 may be disposed. The resin passing through the penetration hole 100 defined in the metal portion 200 is finally discharged through the second groove 320 of the ceramic portion 300.

The ceramic portion 300 may be formed of or include sintered ceramic including ceramic, glass, plastic, and metal powder, but is not limited thereto. The ceramic portion 300 may have an insulator characteristic.

As described, the nozzle 1000 according to the present embodiment includes the metal portion 200 and the ceramic portion 300 surrounding the metal portion 200. Therefore, there is an effect of preventing sparks and electricity generation while maintaining the discharge amount of the resin. Hereinafter, the effect of the nozzle according to the present embodiment will be described.

Figure 3:
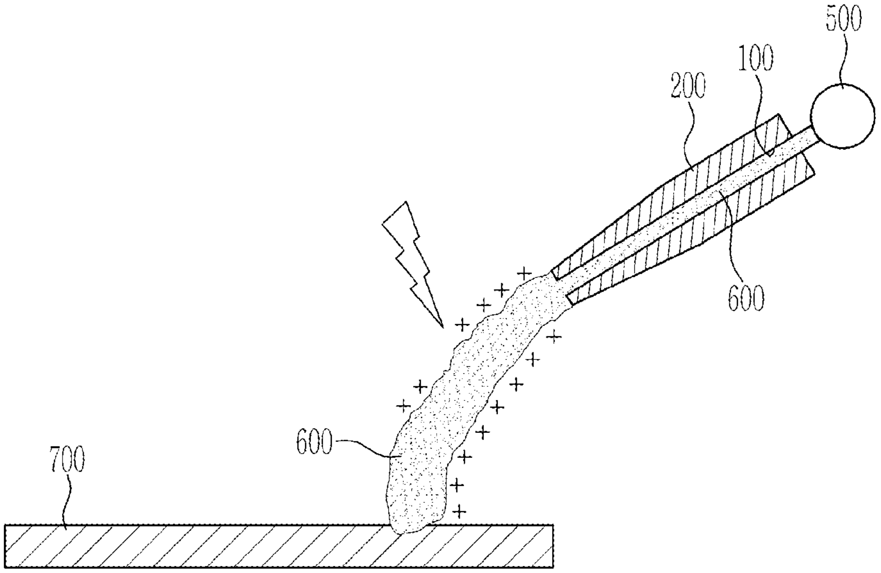
FIG. 3 briefly illustrates the nozzle and a printing device including the nozzle.

FIG. 3 briefly illustrates the nozzle and a printing device including the nozzle. In FIG. 3, the resin supplied from a pneumatic member 500 is electrically charged with a constant charge while passing through an electrode 600. The charged resin is discharged to a target object through the nozzle 1000.

In this case, when the nozzle 1000 includes metal, sparks may occur depending on a distance between the nozzle and the object to be coated. FIG. 3 illustrates that sparks occur when the nozzle 1000 is formed of metal.

Therefore, a non-conductive nozzle such as ceramic may be used to prevent sparks. However, when the non-conductive nozzle is applied, the charged resin in the electrode 600 loses the amount of charge in a nozzle region, which is the insulator, and the change in the amount of thrust and discharge may occur. That is, thrust may be reduced while passing through the non-conductive nozzle.

However, the nozzle 1000 according to the present embodiment has a dual structure in which a metal nozzle is disposed inside the non-conductive nozzle. Therefore, while the amount of charge is maintained by the metal nozzle until the moment the nozzle 1000 is discharged, generation of sparks can be prevented because the discharging end of the nozzle 1000 is covered with the ceramic portion 300.

As shown in FIG. 1, the discharging end of the nozzle 1000 and the end of the metal portion 200 close to the discharging end of the nozzle 1000 may be spaced apart by a first distance D1 (in other words, "separation distance"). That is, the metal portion 200 is disposed inward by the first distance D1 from the discharging end of the nozzle 1000. In this case, the first distance D1 may be 0.1 mm to 3 mm. The first distance D1 is measured in a longitudinal direction (i.e., the central axis direction CX) of the nozzle 1000. This is because sparks may occur at the discharging end of the nozzle 1000 when the metal portion 200 is exposed. That is, when the first distance D1 is shorter than 0.1 mm, sparks may occur at the discharging end of the nozzle 1000. In addition, when the first distance D1 is longer than 3 mm, the resin may lose the electric charge while passing through the ceramic portion 300.

Figure 4:
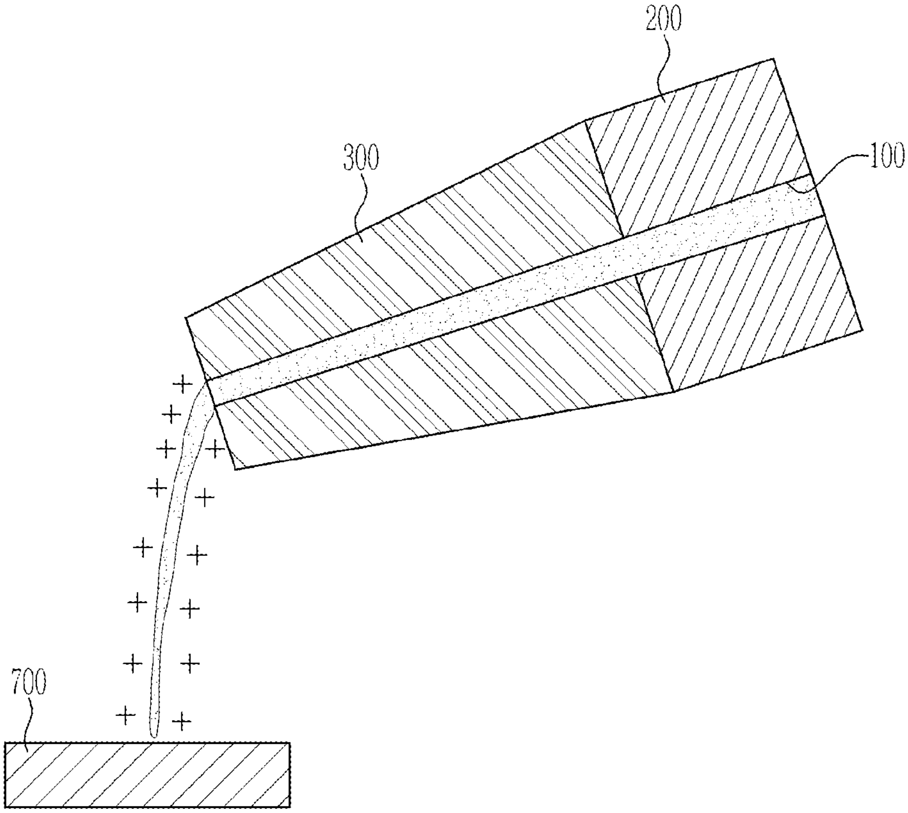
FIG. 4 illustrates an embodiment in which the nozzle is formed of only ceramic.

FIG. 4 illustrates an embodiment in which the nozzle 1000 is formed of only ceramic. As shown in FIG. 4, when the nozzle is formed of only ceramic, the resin loses its electric charge as it passes through the ceramic portion. Therefore, the thrust during discharge is weakened, and the resin may not be discharged in the desired position.

In the resin according to the present embodiment, the nozzle may be integral or detachable. That is, as shown in FIG. 1, the metal portion 200 and the ceramic portion 300 may be connected as one unit and thus the nozzle may be made integrally.

Figure 5:
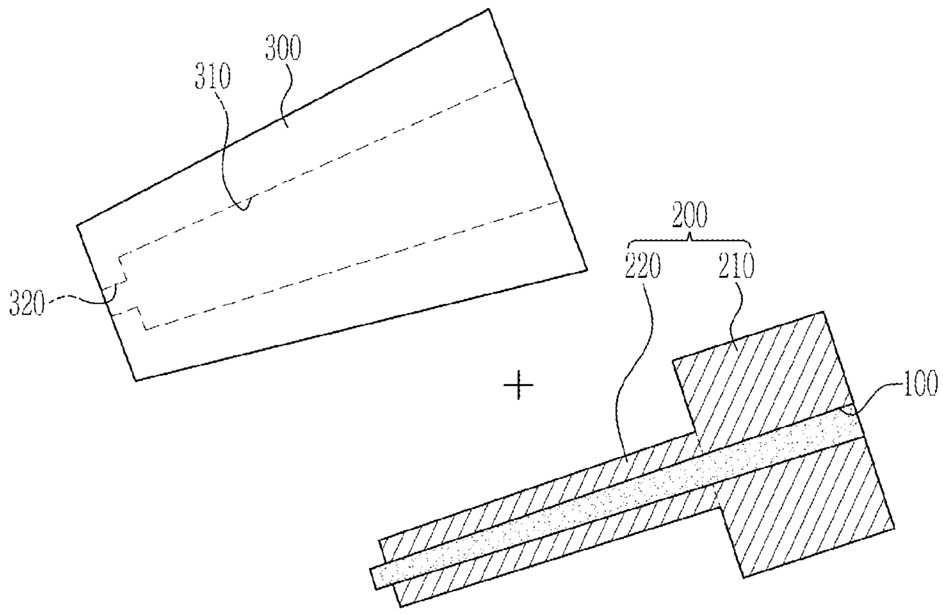
FIG. 5 illustrates a configuration in which a ceramic portion and a metal portion are separated from each other.

Alternatively, as shown in FIG. 5, the ceramic portion 300 and the metal portion 200 may have a structure in which they are separated from each other. In this case, the ceramic portion 300 may be replaced as a consumable.

In the present embodiment, a surface roughness Ra of a portion directly contacting the resin in the nozzle, that is, the penetration hole 100 defined in the metal portion 200 or the second groove 320 of the ceramic portion 300, may be about 0.5 μm or less. Such roughness has a function to prevent sparking.

Now, the effect of the nozzle according to the present embodiment will be described below. Table 1 shows a result of measuring a distance between the nozzle and the object for Embodiment 1 and Embodiment 2.

TABLE 1

| Section | Embodiment 1 (2-Layer) | Embodiment 2 (ceramic) |
|---|---|---|
| W/D (Working Distance) | 150 μm | 50 μm |

Figure 6:
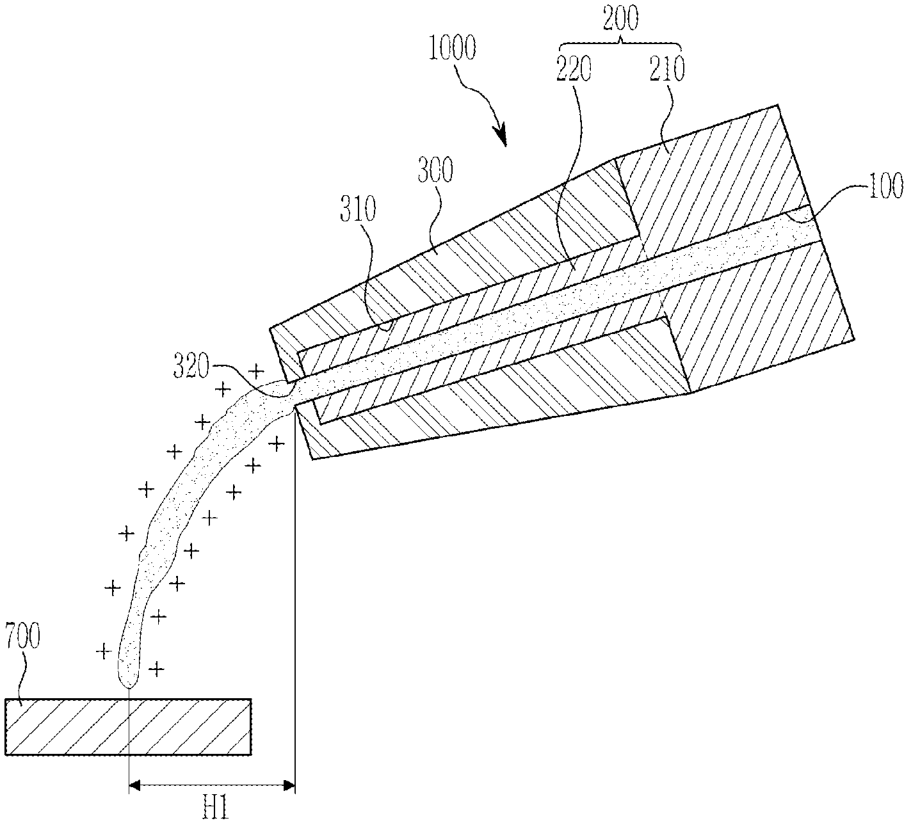
FIG. 6 shows a nozzle of Embodiment 1.
Figure 7:
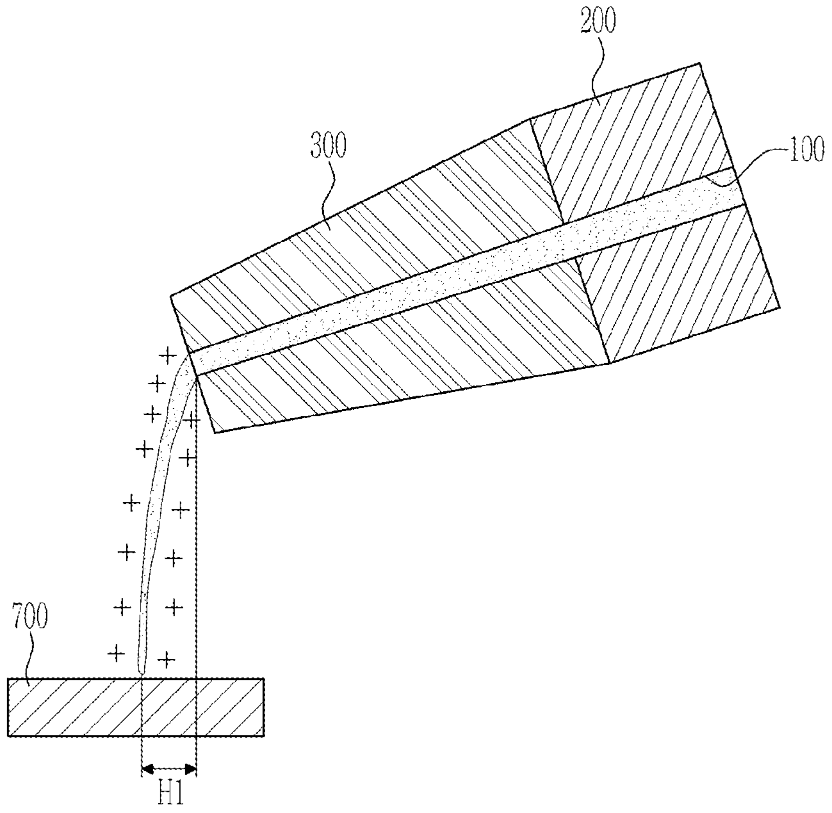
FIG. 7 shows a nozzle of Embodiment 2.

As shown in FIG. 6, in Embodiment 1, a nozzle has a dual structure of a metal portion 200 and a ceramic portion 300. In this case, a distance H1 between the nozzle and an object 700 was 150 μm. As shown in FIG. 7, in Embodiment 2, a nozzle is formed of only a ceramic portion 300. In this case, a distance H1 between the nozzle and an object 700 was 50 μm.

That is, as in Embodiment 1, when the nozzle 1000 has a dual structure of the metal portion 200 and the ceramic portion 300, it was confirmed that the nozzle 1000 discharged the resin farther than the case that the nozzle is formed of only the ceramic portion, as in Embodiment 2. This is because, as described above, in the case of the present embodiment in Embodiment 1, since a metal portion 300 is included in the nozzle 1000, the resin does not lose its electric charge until just before discharge from the nozzle 1000. In the case of Embodiment 2, the resin loses its electric charge as it passes through the ceramic portion, which appears as a decrease in discharge thrust. When the discharge thrust is reduced and the distance H1 between the nozzle and the object is shortened, the risk of collision between the nozzle and the object increases, which is not desirable.

Table 2 shows a result of a repeated discharge experiment for a nozzle having a dual structure of metal portion/ceramic portion as in Embodiment 1. The target amount was 0.5 milligrams (mg), and the average was 0.5025 mg when repeated 20 times, showing a slight error of about 0.4%.

TABLE 2

| No | Target (mg) | Value (mg) | Rate (%) |
|---|---|---|---|
| 1 | 0.5 | 0.49 | −2 |
| 2 | 0.5 | 0.51 | 2 |
| 3 | 0.5 | 0.5 | 0 |
| 4 | 0.5 | 0.52 | 4 |
| 5 | 0.5 | 0.49 | −2 |
| 6 | 0.5 | 0.48 | 4 |
| 7 | 0.5 | 0.51 | 2 |
| 8 | 0.5 | 0.52 | 4 |
| 9 | 0.5 | 0.51 | 2 |
| 10 | 0.5 | 0.5 | 0 |
| 11 | 0.5 | 0.52 | 2 |
| 12 | 0.5 | 0.51 | 2 |
| 13 | 0.5 | 0.51 | 2 |
| 14 | 0.5 | 0.5 | 0 |
| 15 | 0.5 | 0.49 | −2 |
| 16 | 0.5 | 0.48 | −4 |
| 17 | 0.5 | 0.52 | 4 |
| 18 | 0.5 | 0.5 | 0 |
| 19 | 0.5 | 0.48 | −4 |
| 20 | 0.5 | 0.51 | 2 |
| Min | 0.5 | 0.48 | −4 |
| Max | | 0.52 | 4 |
| Average | | 0.5205 | 0.4 |

Table 3 shows a result of a repeated discharge experiment for a nozzle having a single ceramic portion structure as in Embodiment 2. The target amount was 0.5 mg, the same as the condition in Table 2, and the average was 0.4915 mg when repeated 20 times, showing an error of about 1.7%. Comparing the experiments in Table 2 and Table 3, it was confirmed that the nozzle having a dual structure of the metal portion/ceramic portion, as shown in the present disclosure, is advantageous in reducing the discharge amount deviation.

TABLE 3

| No | Target (mg) | Value (mg) | Rate (%) |
|---|---|---|---|
| 1 | 0.5 | 0.49 | −2 |
| 2 | 0.5 | 0.49 | −2 |
| 3 | 0.5 | 0.5 | 0 |

TABLE 3-continued

| No | Target (mg) | Value (mg) | Rate (%) |
|---|---|---|---|
| 4 | 0.5 | 0.47 | −6 |
| 5 | 0.5 | 0.48 | −4 |
| 6 | 0.5 | 0.51 | 2 |
| 7 | 0.5 | 0.5 | 0 |
| 8 | 0.5 | 0.51 | 2 |
| 9 | 0.5 | 0.44 | −12 |
| 10 | 0.5 | 0.51 | 2 |
| 11 | 0.5 | 0.44 | 2 |
| 12 | 0.5 | 0.51 | −4 |
| 13 | 0.5 | 0.51 | 2 |
| 14 | 0.5 | 0.48 | 2 |
| 15 | 0.5 | 0.48 | −4 |
| 16 | 0.5 | 0.51 | 2 |
| 17 | 0.5 | 0.51 | 2 |
| 18 | 0.5 | 0.5 | 0 |
| 19 | 0.5 | 0.49 | −2 |
| 20 | 0.5 | 0.48 | −4 |
| Min | 0.5 | 0.44 | −12 |
| Max | | 0.51 | 2 |
| Average | | 0.4915 | −1.7 |

Figure 8:
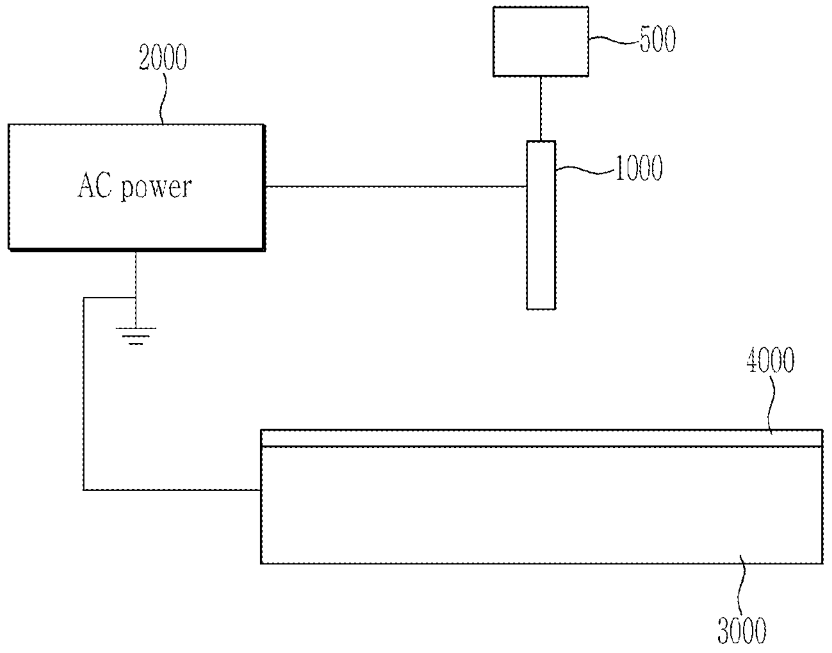
FIG. 8 briefly shows a printing device according to the present embodiment.

Hereinafter, a printing device including the nozzle according to the present embodiment will be described. FIG. 8 briefly shows a printing device according to the present embodiment. Referring to FIG. 8, a printing device according to the present embodiment may include a nozzle 1000, an alternating current ("AC") power source 2000, and a conductive substrate 3000.

The description of the nozzle 1000 is omitted as it is the same as described above. That is, the nozzle 1000 may have a dual structure of a metal portion 200 and a ceramic portion 300 as shown in FIG. 1. Resin may be disposed in a penetration hole 100 inside the nozzle 1000 and a second groove 320 of the ceramic portion 300.

A pneumatic member 500 is connected to the nozzle 1000 and provides air pressure to the nozzle 1000 such that resin is supplied to the nozzle 1000. When the resin is discharged from the nozzle 1000, the pneumatic member 500 provides air pressure to the resin, thereby assisting the discharge of the resin from the nozzle 1000. In an embodiment, such a pneumatic member 500 may be, for example, a pump.

An insulating substrate 4000 is disposed on a conductive substrate 3000, and the conductive substrate 3000 may support the insulating substrate 4000.

The insulating substrate 4000 may include at least one of polyethylene terephthalate ("PET"), polypropylene ("PP"), polyethylene ("PE"), ethylene vinyl acetate ("EVA"), acrylonitrile butadiene styrene ("ABS"), polyacetylene, polystyrene, polyurethane, polyamide ("PA"), and polybutylene terephthalate ("PBT"), glass, and polyimide ("PI").

Figure 9:
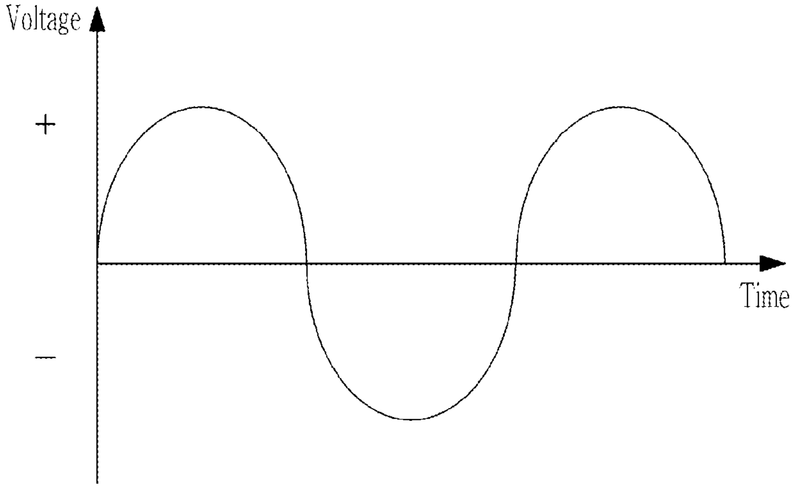
FIG. 9 and FIG. 10 illustrate a voltage applied to the AC power source.
Figure 10:
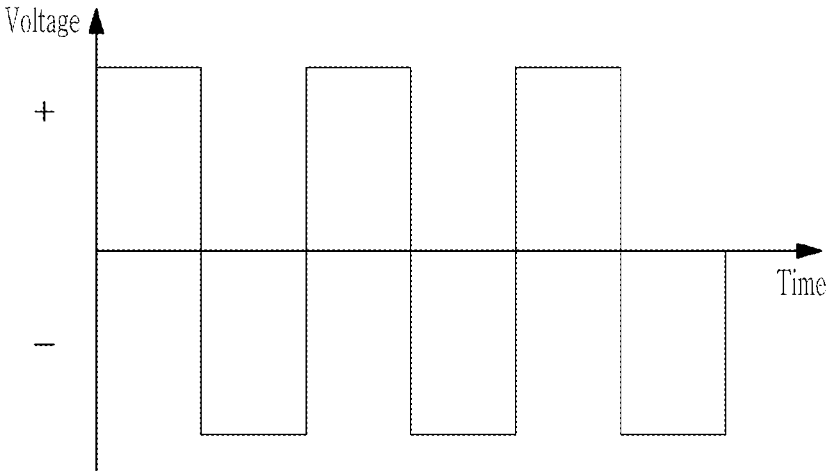

FIG. 9 and FIG. 10 illustrate a voltage applied to the AC power source 2000. The AC power source 2000 may apply a sine-type AC voltage as shown in FIG. 9 or a pulse-type AC voltage as shown in FIG. 10. However, this is just an example, and an AC voltage in which "+" voltage and "−" voltage alternate may be applied in various forms.

The AC power source 2000 is electrically connected to the nozzle 1000, and the AC voltage is applied to the nozzle 1000 to generate electro-hydraulic phenomena.

The nozzle 1000 may be charged with "+" by the AC voltage applied by the AC power source 2000, and accordingly, the resin may also be charged with "+" through the nozzle 1000. The resin charged with the "+" is discharged from the nozzle 1000 and lands on the substrate. In this case, the resin may still be charged with "+".

However, the nozzle 1000 is not limited thereto, and according to the characteristics of the AC voltage, it may be charged to "−", which is the opposite polarity to the previous one, and accordingly, the resin may also be charged to "−" through the nozzle 1000.

In this case, the "−" charged resin is discharged from the nozzle 1000 and lands on the substrate. In this case, the resin that is charged with the "+" and charged with "−" by the pre-landed resin may be attracted to the substrate, and such a phenomenon is an electrohydrodynamic phenomenon.

Here, the power is an AC power, which is a voltage in the range of 150 volts (V) to 500 V, and may apply an AC voltage having a frequency in the range of 10 Hz to 500 Hz to the nozzle 1000. When the voltage is below the 150 V, the resin may not be discharged.

In FIG. 8, the nozzle is shown as a configuration that is vertically disposed on the insulating substrate, but this is only an example, and as shown in FIG. 3, the nozzle may be disposed in a diagonal direction in another embodiment.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A nozzle comprising:

a metal portion, which defines a penetration hole therein; and a ceramic portion, which surrounds the metal portion, wherein the metal portion includes a first region and a second region having a narrower diameter than the first region, the ceramic portion surrounds the second region, and an end of the metal portion close to a discharging end of the nozzle is spaced apart from an end of the ceramic portion close to the discharging end, wherein the ceramic portion defines a first groove having a diameter corresponding to an outer diameter of the second region of the metal portion and a second groove having a narrower diameter than the first groove, wherein the second groove is disposed at the discharging end of the nozzle, and wherein the second groove does not overlap the metal portion in a view perpendicular to a central axis direction of the nozzle.

2. The nozzle of claim 1, wherein a separation distance between the end of the metal portion and the end of the ceramic portion is 0.1 millimeters (mm) to 3 mm.

3. The nozzle of claim 1, wherein the second groove is connected to the penetration hole defined in the metal portion.

4. The nozzle of claim 1, wherein a length of the second groove in a longitudinal direction of the nozzle is 0.1 mm to 3 mm.

5. The nozzle of claim 1, wherein a surface roughness of the penetration hole of the metal portion is about 0.5 micrometers (μm) or less.

6. The nozzle of claim 1, wherein a surface roughness of the second groove of the ceramic portion is less than 0.5 μm.

7. The nozzle of claim 1, wherein the ceramic portion is removable from the metal portion.

8. The nozzle of claim 1, wherein a resin to be sprayed from the nozzle sequentially passes through the penetration hole of the metal portion and the second groove of the ceramic portion before being sprayed.

9. The nozzle of claim 1, wherein the ceramic portion contains a sintered ceramic including a ceramic, glass, plastic, and metal powder.

10. The nozzle of claim 1, wherein the ceramic portion has a non-conductive characteristic.

11. A printing device comprising:

a nozzle; and a power supply, which applies a voltage to the nozzle, wherein the nozzle comprises:

a metal portion defining a penetration hole therein, and a ceramic portion, which surrounds the metal portion, wherein the metal portion includes a first region and a second region having a narrower diameter than the first region, the ceramic portion surrounds the second region, and an end of the metal portion close to a discharging end of the nozzle is separated from an end of the ceramic portion close to the discharging end, wherein the ceramic portion defines a first groove with a diameter corresponding to an outer diameter of the second region of the metal portion and a second groove with a narrower diameter than the first groove, wherein the second groove is disposed at the discharging end of the nozzle, and wherein the second groove does not overlap the metal portion in a view perpendicular to a central axis direction of the nozzle.

12. The printing device of claim 11, wherein a distance between the end of the metal portion and the end of the ceramic portion is 0.1 mm to 3 mm.

13. The printing device of claim 11, wherein the second groove is connected to the penetration hole defined in the metal portion.

14. The printing device of claim 11, wherein a length of the second groove in a longitudinal direction of the nozzle is 0.1 mm to 3 mm.

15. The printing device of claim 11, wherein a surface roughness of the penetration hole of the metal portion and the second groove of the ceramic portion is about 0.5 μm or less.

16. The printing device of claim 11, further comprising a pneumatic member connected to the nozzle.

* * * * *